A. T. LARGE.
Hand-Seeder.

No. 62,642.

Patented Mar. 5, 1867.

Witnesses:
Theo. Tusche
Wm. Trewin

Inventor:
A. T. Large
per Munn & Co.
Attorneys.

United States Patent Office.

A. T. LARGE, OF CHICAGO, ILLINOIS.

Letters Patent No. 62,642, dated March 5, 1867.

---

IMPROVEMENT IN SEED-DROPPING ATTACHMENT FOR HOES.

---

The Schedule referred to in these Letters Patent and making part of the same.

---

TO ALL WHOM IT MAY CONCERN:

Be it known that I, A. T. LARGE, of Chicago, in the county of Cook, and State of Illinois, have invented a new and improved Seed-Dropping Attachment for Hoes; and I do hereby declare that the following is a full, clear, and exact description thereof, which will enable others skilled in the art to make and use the same, reference being had to the accompanying drawings, forming part of this specification.

This invention relates to a new and improved seed-dropping attachment for hoes, and is an improvement on a similar device for which Letters Patent were granted to me bearing date November 27, 1866. The object of the present improvement is to simplify the original patented device, economize in the construction, and at the same time retain all the advantages it possesses. In the accompanying sheet of drawings—

Figure 1:
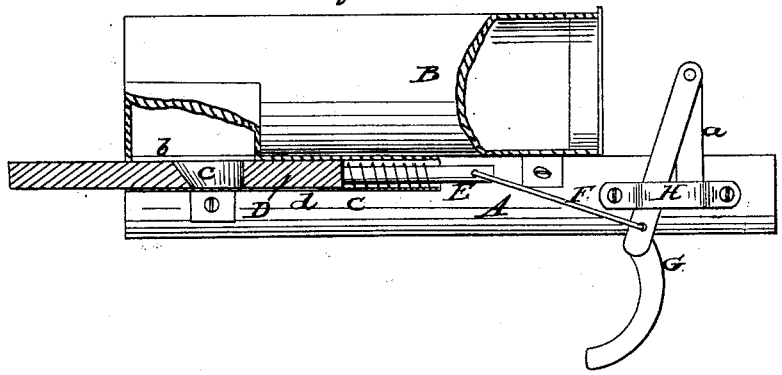
Figure 2:
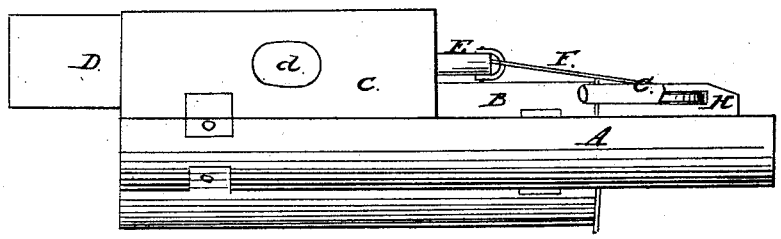

Figure 1 is a side sectional view of my invention, taken in the line $x\ x$, fig. 2.

Figure 2, an inverted plan of the same.

Similar letters of reference indicate like parts.

A represents a portion of the handle of a hoe, and B a sheet-metal seed-box attached to the upper side thereof, near the end, just above where the hoe is attached. This seed-box may be of cylindrical or other proper form, and to one side of it, and adjoining the handle A, there is attached a small rectangular sheet-metal box, C, in which a wooden slide, D, is fitted and allowed to work freely, said slide having a rod, E, attached to its inner end, which rod passes through the inner end of the box C, and is connected by a wire, F, to a lever, G, which is attached to an arm, $a$, on the handle A, and passes through a guide, H, on the handle. In the inner part of the box C, between the slide D and the inner end thereof, around the rod E, there is placed a spiral spring, I, which has a tendency to keep the slide D forced outward to the extent of its movement; the lever G and guide H serving as a stop therefor, as will be fully understood by referring to fig. 1. The seed-box B communicates with the box C by means of an opening, $b$, and in the slide D there is made an opening, $c$, which serves as a seed-cell, said opening $c$ being kept in line with the opening $b$ by means of the spring I when no power is applied to the lever G, as will be fully understood by referring to fig. 1. In the bottom of the box C there is made an opening, $d$, through which the seed is discharged, and this opening is made at such a point that it will be in a line with the opening $c$ when the slide is drawn backward to its fullest extent. A wire is attached to the lever G, which extends along the side of the handle at a distance to be conveniently operated by the right hand of the operator where he grasps the handle. In dropping the seed, all that is required is simply to draw the slide D backward so that the opening $c$ will be brought in line with the opening $d$, and then suddenly releasing the lever so that the spring I will be allowed to force forward the slide and bring the opening $d$ in line with the opening $c$ in the seed-box, so that the opening $d$ may again be filled with seed, which is discharged as before when the slide D is drawn backward. The device, it will be seen, is extremely simple and efficient, may be constructed and applied at a small cost, and operated with the greatest facility in connection with the hoe.

Having thus described my invention, I claim as new, and desire to secure by Letters Patent—

The seed-box B with the box C attached, and provided respectively with the openings $b\ d$, in combination with the slide D placed within the box C, provided with the opening $c$, and operated by the spring I and lever G, all arranged and applied to the handle of a hoe, substantially as shown and described.

A. T. LARGE.

Witnesses:
A. T. LARGE, Jr.,
W. H. LARGE.